United States Patent [19]

Swarovski et al.

[11] 4,056,303
[45] Nov. 1, 1977

[54] OPTICAL INSTRUMENT IN WHICH EYEPIECE TUBE AND OBJECTIVE TUBE ARE SURROUNDED IN CAST RESIN TO MAKE A RIGID CORE ENCLOSED IN FOAMED SYNTHETIC RESIN

[75] Inventors: Daniel Swarovski, Wattens; Kurt Schwab, Innsbruck, both of Austria

[73] Assignee: D. Swarovski & Co., Glasschleiferei, Wattens, Austria

[21] Appl. No.: 687,457

[22] Filed: May 18, 1976

[30] Foreign Application Priority Data

May 22, 1975 Germany .............................. 2522738
Apr. 27, 1976 Germany .............................. 2618497

[51] Int. Cl.² .............................................. G02B 23/18
[52] U.S. Cl. ........................................ 350/36; 350/67

[58] Field of Search ................. 350/36, 8, 67, 61, 320, 350/321

[56] References Cited

U.S. PATENT DOCUMENTS 3,531,177  10/1970  Akin, Jr. ................................ 350/36

*Primary Examiner* — Jon W. Henry

[57] ABSTRACT

An optical instrument, for example a field-glass, in which the image-erecting system, the eyepiece tube and the objective tube are embedded in synthetic resin to form the housing of the instrument. The image-erecting system and the eyepiece and objective tubes and, if required, the hinge mechanism, are wholly or partially surrounded in cast resin to make a rigid core and this rigid core is partially or wholly enclosed in foamed synthetic resin.

13 Claims, 2 Drawing Figures

OPTICAL INSTRUMENT IN WHICH EYEPIECE TUBE AND OBJECTIVE TUBE ARE SURROUNDED IN CAST RESIN TO MAKE A RIGID CORE ENCLOSED IN FOAMED SYNTHETIC RESIN

The invention relates to optical instruments, especially field-glasses and to a method of making them.

From Austrian Pat. No. 293,054 there is known a method of making optical instruments in which the image-erecting system is mounted between the objective and the eyepiece and optically aligned and a foamed synthetic resin in the form of a packing is applied, this packing being in contact with, and embracing parts of the image-erecting system and the objective and eyepiece assemblies. The foamed synthetic resin is allowed to cure to form a rigid protective housing and subsequently, if necessary, the external surfaces of the housing are provided with an adherent synthetic resin covering.

However, this known method and the optical instruments produced by it have serious drawbacks. High temperatures and also high pressures arise during curing of the foamed synthetic resin. On account of the different thicknesses of the layers of the synthetic resin foam, significant thrust forces act on the components within. This can lead to complete destruction of the alignment, and it can no longer be subsequently corrected. A further serious drawback is that the periods of occupation of the foam moulds are very long as the curing of the foamed synthetic resin takes (according to temperature) anything from 20 minutes to an hour. Any premature removal from the mould gives rise to a danger of loss of alignment.

The temperatures that arise during foaming depend largely on the polymerisate which is used, the catalyst and the quantity of material involved. In the known construction, in order to obtain at least partially satisfactory rigidity, one has to work with large quantities. This requires a high curing temperature, which gives rise to stresses and damage to the optical components. The known field-glasses are moreover not sufficiently torsionally stiff so their optical quantity is unsatisfactory and damage can arise to the optical elements. Finally the desired standards of impact resistance and resistance to changes in temperature are inadequate.

The invention is based on solving the problem of providing optical instruments, in particular field-glasses, which are distinguished in particular by high impact resistance, water tightness, resistance to temperature changes, and torsional stiffness, and of which the manufacture involves no misalignment and damage to the optical components.

This problem is solved by an optical instrument, in particular a field-glass, of which the image-erecting system and the eyepiece and objective tube are embedded in synthetic resin which simultaneously forms the housing of the instrument and which is characterized in that the image-erecting system and the eyepiece and objective tube and, if required, the hinge mechanism, are wholly or partially surrounded in cast resin to make a rigid core and this rigid core is partially or wholly enclosed in foamed synthetic resin.

By the term "core" there is to be understood in this connection the optical elements and the eyepiece tube and objective tube. In particular the core includes the image-erecting system and the eyepiece and objective tubes.

The phrase "rigid core" means the core, if necesssary including the hinge mechanism and any reinforcing elements, enclosed in rigid synthetic resin.

The optical instruments according to the invention are distinguished by a high torsional stiffness. This is essential, amongst other things, for achieving high optical quality. This torsional stiffness is achieved mainly by the rigid synthetic resin which encloses and adheres to the core and, if necessary, the hinge mechanism, whereby the individual components are rigidly connected together and located in position.

The optical instruments according to the invention are distinguished further by high impact resistance. The housing is made of soft synthetic resin and surrounds the rigid core, and the rigid core is completely embedded in the soft synthetic resin. The soft synthetic resin is in a position to absorb large impact energies and accordingly to protect the rigid core and the optical elements from damage.

The optical instruments according to the invention can furthermore be of such a form that they are able to withstand wide variations in temperature, for example over the range from $-60°$ to $+80°$ C. Large temperature changes can lead to high stresses because of the different coefficients of thermal expansion of the materials of the tubes, the image-erecting system and the cast resin, whereby the image-erecting system, usually made of glass may be damaged, especially its weak peripheral portions.

To prevent such damage the cast resin is preferably applied to the core in such a way that the resin is not in direct contact with the image-erecting system. In addition it is of advantage to provide an intermediate member of resilient material between the tubes and the image-erecting system. This can absorb the stresses which arise on changes of temperature.

By the use of a soft synthetic resin of lower specific gravity than water it is possible to produce optical instruments, for example field-glasses, which float.

The external shape of the instrument can easily be varied because the optical components are not incorporated in a ready-made housing but are enclosed in foamed synthetic resin, which allows the exercise of a wide choice in the shape which is given to the article. By the possible use, according to the invention, of soft highly resilient synthetic resin as the housing body it is indeed possible to select shapes in which there are re-entrant portions. For example this is significant in certain surface textures, such as an orange peel structure.

Any desired change of shape can be put into practice easily as one can select from a wide range of possible variations of shape simply by changing th foaming mould whilst maintaining a given core. In this way various easily handled and aesthetically satisfying shapes can be produced.

By incorporating various coloring materials and pigments into the soft synthetic resin products of the widest possible variation in color can be produced. For example it is possible to produce field-glasses in restrained colors such as green, brown or grey or in striking bright colors like red or in phosphorescent colors. The color which is chosen depends on the purpose. No applied coating or protective layer is necessary.

A further advantage of the instruments according to the invention is that they can be made waterproof. The core, covered with synthetic resin, prevents the penetration of external damp. By casting around the aligned objective lenses and by the use of air-tight eyepieces, a completely air-tight article is obtained.

Moreover the instruments can be made so that repair is possible.

An example of a field-glass according to the invention is illustrated in the accompanying drawings, in which.

Figure 1:
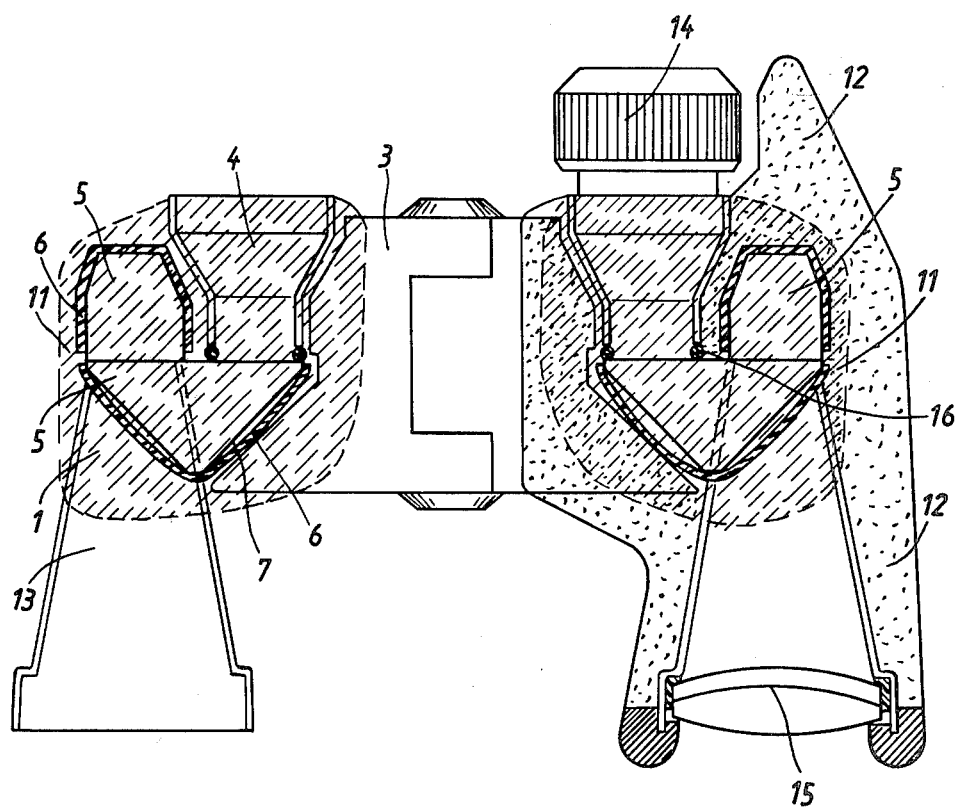
FIG. 1 shows a section through a field-glass according to the invention.

The left-hand side of FIG. 1 shows a section through the core with the applied cast resin indicated in plan view by the hatched region. The right-hand half shows in section a finished field-glass enclosed in foamed synthetic resin.

The core 1 of the optical instrument according to the invention preferably comprises two reflecting prisms 5, an eyepiece tube 4 and an objective tube 13.

The tubes have, amongst other things, the function of defining within the housing an air-filled space for the passage of the light. The objective and the eyepiece are secured to the ends of the tubes. The shape of the tubes is determined substantially by the optical requirements of the instrument. They can be made of various materials, such as synthetic resins or metals and are preferably made of aluminum.

The image-erecting system 5 can be made in various ways. Preferably Porro prisms are employed. To simplify the production their operative surfaces can be silvered and provided with a protective coating of lacquer. Preferably, however, the operative surfaces of the prisms are provided with protective covers 6 to form an air cushion 7 at the surfaces in question. In this way total reflection is and consequently the maximum light transmission through the instrument. The protective covers can be made of various materials, for example synthetic resins or metals. The covers 6 could have holes in them.

The core and hinge mechanism are preferably aligned before the cast resin 11 is applied so that the optical axes and the axis of the hinge mechanism are parallel. This can be achieved in various known ways. Preferably it is undertaken in a suitable mould which has locating means for the various components so as to be able to locate the parts easily in their optically correct positions.

The core and the parts of the hinge mechanism can now be embedded in cast resin without loss of position of the individual parts. This is normally achieved by a casting process but it could equally be done by the use of a spatula.

However preferably the individual parts are stuck together before the casting step. One can use any suitable adhesive that will produce a secure bond between the parts and will not attack them. The choice of adhesive depends on the materials employed, for example for the tubes. Suitable adhesives are for example epoxy resins (e.g., Loctite UV 353, rapid Araldite AW 2102 or Araldite AW 106). If desired the hinge mechanism 3 is also stuck to the remainder. The hinge mechanism is preferably of such a form that it provides as large as possible a surface for adhesion to the core.

In addition reinforcing elements can be provided to improve the stiffness and stability of the core. A better stiffening of the core can be achieved through these parts by three-point location. The appropriate shape for these reinforcing elements is determined to a certain extent by the design. For example the elements may be in the form of strips and bars or rods.

Figure 2:
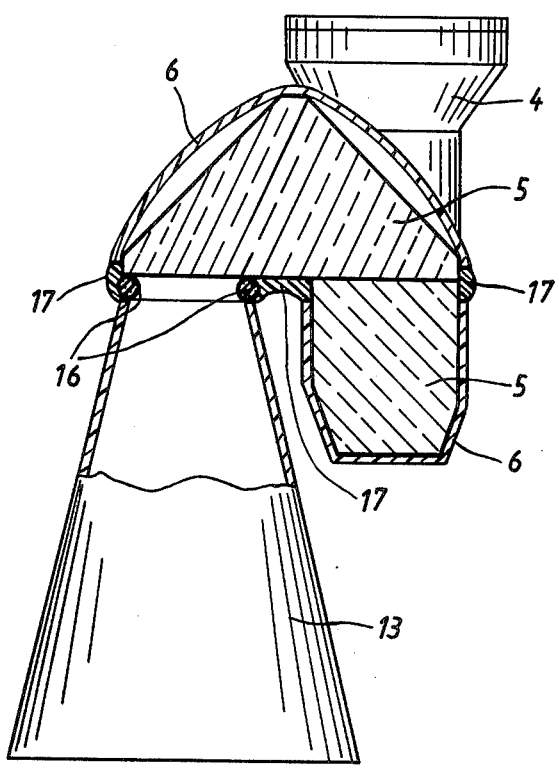
FIG. 2 is a section through the core of the field-glass.

FIG. 2 shows a preferred embodiment of the instrument according to the invention, which is distinguished by particularly good resistance to temperature change and to impact.

If the various parts of the instrument are rigidly connected together by the cast resin, stresses can arise as a result of the differing co-efficients of thermal expansion of the materials of the tubes, the image-erecting system and the resin, and this can lead to damage to the image-erecting system, which is normally made of glass. It is desirable that field-glasses should be capable of use without damage over a wide temperature range, for example from −60° to +80° C.

Damage to the instrument by temperature changes can be prevented by applying the cast resin in such a way that it does not come into direct contact with the image-erecting system.

This can be done by providing the glass prisms 5 with the above-mentioned covers 6 and by applying a layer of deformable material to any points on the glass which remain uncovered. In the absence of any protective covers the layer of deformable material is applied over the whole of the region of the image-erecting system with which the resin comes into contact. The resin that is applied then only comes into indirect contact with the image-erecting system through the deformable material and/or the protective covers.

In FIG. 2 the prisms are covered for the greater part by the protective covers 6. The remaining part of the glass between the tubes and the covers is coated with deformable material 17. Preferably a highly elastic synthetic resin is used for this, for example silicone rubber. The application of a thin layer of about 1 to 2 mm of the material 17 is normally enough. Where the covers 6 have holes in them the resulting exposed points on the glass are covered with the deformable material 17. The material applied in this way, preferably of highly elastic synthetic resin, acts to keep away from the glass bodies the tensional stresses that are produced by changes in temperature, and thereby to avoid damage to the image-erecting system.

An intermediate member 16 of elastic material is preferably provided between the tubes 4, 13 and the image-erecting system. This member likewise serves to absorb stresses due to temperature changes and shocks. The member 16 may suitably be in the form of a ring of synthetic resin or rubber. Preferably the tubes 4, 13 are stuck to the image-erecting system through the intermediate member 16.

The casting of resin around the core 1 is preferably done in a suitable mould.

Casting resins suitable for the purpose are widely known. According to the invention their function lies in connecting or sticking the core and the hinge mechanism together and in this way locating them in their positions. This location is important as otherwise the possibility of misalignment when the soft foamed plastic is applied as a real one and on the other hand it is not possible to obtain adequate torsional rigidity in the finished instrument.

Suitable casting resins for producing the rigid core are, for example, solventless thermo-setting resins. Examples are: epoxy resins, furan resins, polyester resins and so on. Epoxy resins are particularly preferred. The resin may contain fillers.

The coating of cast resin around the core must on the one hand have a certain thickness in order to obtain sufficient rigidity and torsional stiffness. On the other hand it must not be too thick as otherwise it would interfere with the desired external shape, i.e., the coating of cast resin must be thin enough to allow the instrument to have an attractive overall shape.

It is not necessary that the individual components of the core should be completely covered with the cast resin. For example it is enough if only parts of the tubes are covered by it. The actual hinge portion of the hinge mechanism is left free of resin.

The casting of the resin around the core and the hinge mechanism can be done in suitable moulds. The moulds may in particular be lined with silicone rubber. Such flexible moulds also allow the casting of re-entrant portions.

In some cases, according to the materials chosen for the core and according to the casting resin, the parts that are to be embedded in the resin can be treated first with a layer of priming material.

The resin is preferably cured at room temperature to avoid stresses in the optical elements.

The rigid core 1 is then enclosed in foamed sythetic resin 12. This resin simultaneously forms the housing for the instrument, apart from the actual hinge portion of the hinge mechanism.

Examples of foamed soft flexible synthetic resins are latex foam, polymerisate foams, polycondensate foams, e.g. urea formaldehyde resins, phenol resins, silicone foams, epoxy resin foams and polyurethane foams. The preferred material is a flexible polyurethane foam. Such flexible polyurethane foams are obtained from linear and lightly branched polyhydroxy compounds of high molecular weight.

The application of the foam material around the rigid core, preferably with the exception of the actual hinge portion of the hinge mechanism, is done in a suitable mould. The shape of the mould is dependent on the shape of the instrument required and on its desired external form. The flexible resilient synthetic resin embeds the rigid core. The thickness of the foamed layer is chosen to give the core adequate protection and impact resistance. The standards of accuracy of the mould used in applying the foam are low. The soft resilient synthetic resin absorbs the forces that arise when the instrument is removed from the mould after the application of the foam. The presence of the rigid core, on the other hand, ensures that there is no displacement of the optical axes.

The foamable synthetic resin, preferably polyurethane, is introduced into the closed mould through suitable openings and is then caused to foam. It preferably forms an integral foam having a continuous sealed outer skin and it embeds the rigid core.

Various coloring materials or dyes and pigments, stabilizers, catalysts and so on can be added to the synthetic resin. The step of enclosing the core in a foamed soft resilient synthetic resin results in optical instruments of high impact resistance and waterproof qualities. At the same time the presence of the hard resin that makes the core rigid results in a high degree of torsional stiffness.

The objective and eyepiece can be enclosed in foam as parts of the core. However preferably the eyepiece and objective lenses are inserted after the application of the foam material.

Ordinary objective and eyepiece systems of various forms and optical qualities can be employed. Preferably eyepiece systems are used that are water-tight and air-tight and are of adjustable focus. The air-tight eyepiece is connected to the eyepiece tube in a suitable air-tight manner. The inserted objective lenses are aligned and then are sealed in a water-tight and air-tight manner to the housing of the instrument by casting a synthetic resin or silicone rubber. The eyepiece and objective systems are preferably mounted in such a way that they can easily be removed, for example for any repair that may be necessary.

The right-hand part of FIG. 1 shows a section through a finished field-glass. The rigid core 1 is surrounded by the housing of soft synthetic resin 12. The eyepiece 14 and the objective 15 are shown in place.

The concept of the invention makes it possible to produce optical apparatus on a so-called "modular" basis. For a give shape, optical elements of various qualities and constructions can be inserted. Equally, by replacing the mould used for applying the foamed layer, the external shape of the apparatus can easily be changed.

The invention has been described primarily with reference to field-glasses. However it will readily be apparent to the expert that the invention is applicable to a multitude of optical instruments, such as telescopes, microscopes and so on.

We claim:

1. An optical instrument comprising:
    an image-erecting system;
    an eyepiece tube;
    an objective tube;
    said image-erecting system, said eyepiece tube and said objective tube being at least partially enclosed in cast resin and thereby positioned and forming a rigid core; and
    a foamed synthetic resin covering extending around the periphery of said rigid core and fixedly secured thereto to form the housing of the instrument.

2. Optical instrument according to claim 1 characterized in that the image-erecting system, the eyepiece tube, and the objective tube of the core are secured together.

3. Optical instrument according to claim 1 characterized in that the image-erecting system is provided with protective covers.

4. Optical instrument according to claim 1 characterized in that the cast resin is not in direct contact with the image-erecting system.

5. Optical instrument according to claim 3 characterized in that the cast resin engages the image-erecting system only through the protective covers.

6. Optical instrument according to claim 1 characterized in that an intermediate member of elastic material is provided between the tubes and the image-erecting system.

7. Optical instrument according to claim 1 characterized in that the casting resin is an epoxy resin.

8. Optical instrument according to claim 1 characterized in that the foamed synthetic resin is an integral foam with a continuous outer skin.

9. Optical instrument according to claim 1 characterized in that the foamed synthetic resin is a foamed polyurethane resin.

10. Optical instrument according to claim 1 characterized in that the objective and the eyepiece are not surrounded by the foamed synthetic resin.

11. Optical instrument according to claim 1 characterized in that additional reinforcing elements are provided for location purposes, these elements locating the image-erecting system, the eyepiece tube, and the objective tube with respect to one another.

12. Optical instrument according to claim 1, further comprising a hinge mechanism partially enclosed in the cast resin and forming part of the rigid core.

13. Optical instrument according to claim 1, characterized in that the cast resin engages the image-erecting system only through a layer of deformable material.

* * * * *